Patented Feb. 23, 1954

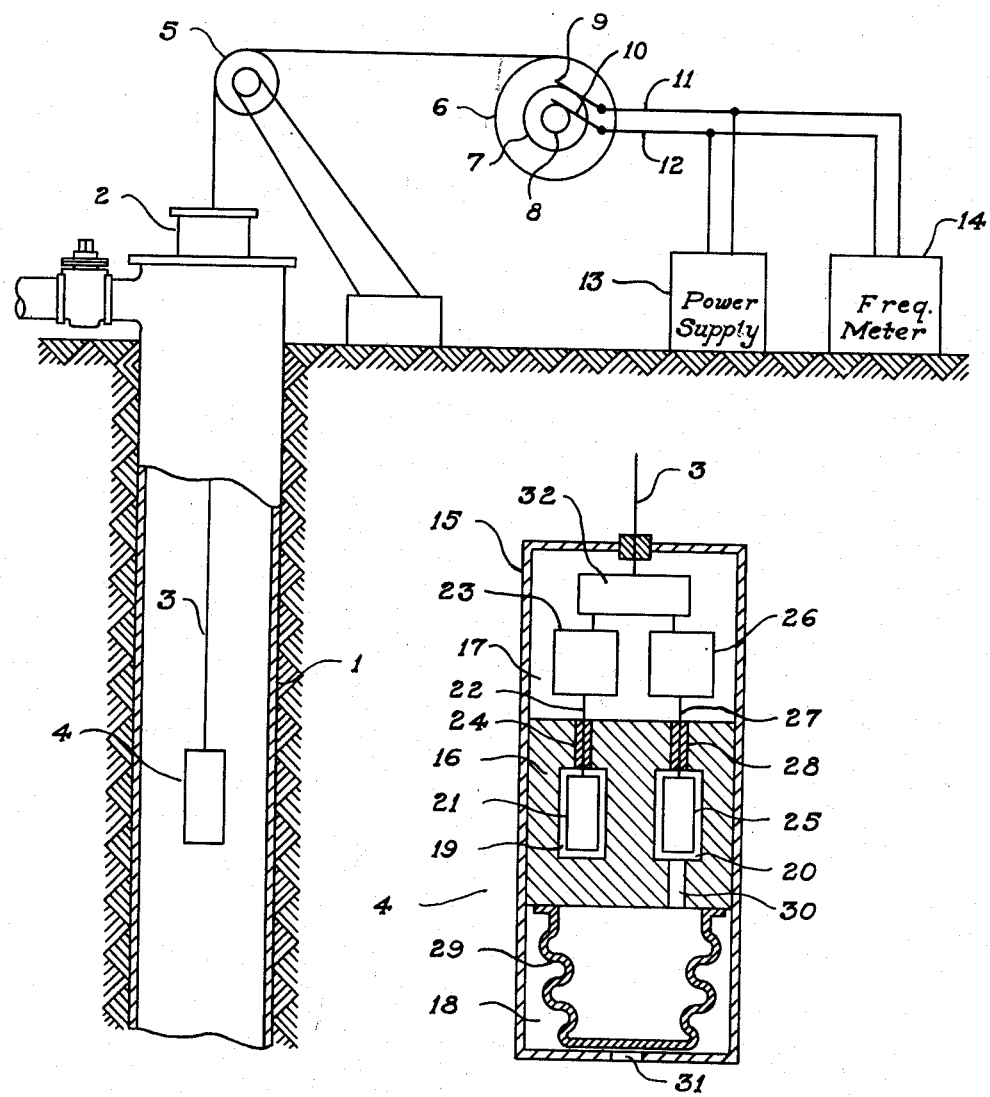

2,669,877

UNITED STATES PATENT OFFICE 2,669,877

PRESSURE MEASURING DEVICE

Henry F. Dunlap, Dallas, Tex., and John H. Ramser, Chester, Pa., assignors to The Atlantic Refining Company, Philadelphia, Pa., a corporation of Pennsylvania Application November 30, 1948, Serial No. 62,712

4 Claims. (Cl. 73—398)

This invention relates to pressure measuring devices and more particularly to such a device adaptable for measuring pressures at localities inaccessible to an observer and having remote indicating means whereby said pressures may be continuously observed.

Various devices are known and employed for measuring fluid pressure within an oil well or at other locations inaccessible to an observer. One such device employs an arcuate metal tube of elliptical cross-section having one end thereof open and secured against movement and the other end hermetically sealed and provided with a stylus which is in contact with a recording drum. The instrument is so constructed that when placed in a fluid the pressure thereof is exerted only on the interior of the tube.

In operation, the instrument is lowered into a well by means of a cable, for example, and the fluid contained therein passes into the tube through the open end thereof and exerts pressure thereon. The configuration of the tube is such that this pressure effects a change in the degree of curvature of the tube to an extent dependent upon the magnitude thereof, which change is recorded by means of the stylus which is secured to the free end of the tube. In this manner a log of the pressure is produced on the recording drum which may be read directly in pounds per square inch by calibration of the instrument.

Although the above described pressure measuring device is satisfactory for some purposes, it does not permit continuous observation of pressure. Moreover, hysteretic phenomena introduce errors in the logs and diminish the accuracy of the instrument.

Other pressure measuring devices are known and in use; however, none of these devices heretofore known are adaptable for measuring pressures at locations inaccessible to an observer over a large pressure range with a high degree of accuracy while permitting continuous observation of such pressures at a remote point.

Accordingly, one object of the present invention is to provide a pressure measuring device suitable for measuring fluid pressure over a relatively large pressure range with a high degree of accuracy.

Another object is to provide an instrument for measuring fluid pressure at locations inaccessible to an observer and having remote indicating means whereby said pressure may be continuously observed.

A further object is to provide a pressure measuring device employing a crystal oscillator adaptable for measuring fluid pressure at locations inaccessible to an observer with a high degree of accuracy and over a relatively large pressure range.

Other objects and features will be apparent from the drawings and description which follow.

Figure 1 is a diagrammatic view showing the invention as employed in measuring pressure within a well.

Figure 2 is an enlarged, diagrammatic view, partially in section, showing that portion of the device which is lowered into the well.

Figure 3:
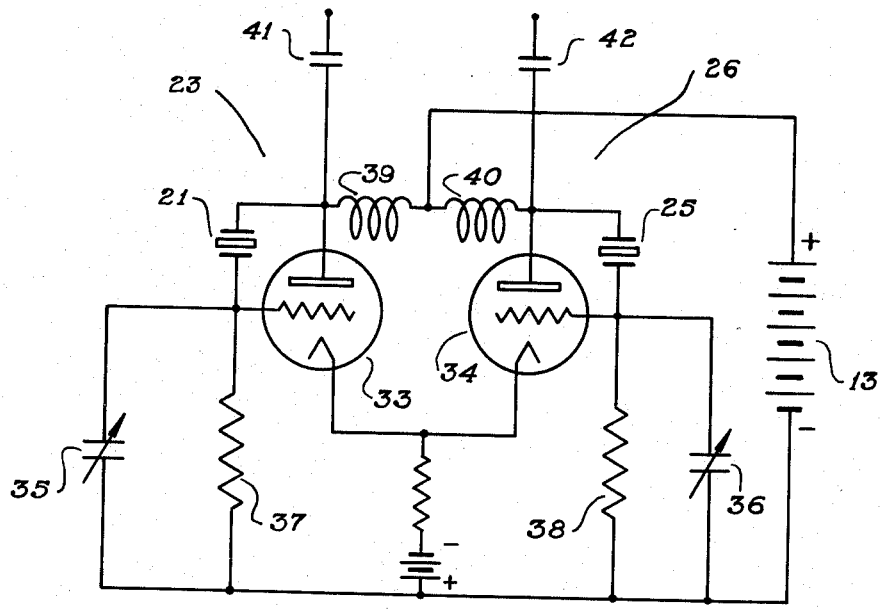
Figure 3 is a schematic diagram showing both crystal oscillators.

It has been found that a linear relationship exists between the frequency of oscillation of a crystal oscillator and the pressure exerted on the crystal up to a pressure of 7,000 pounds per square inch and higher. Accordingly, the pressure of a fluid medium may be readily ascertained by exposing the crystal of such an oscillator to the medium and measuring the resulting frequency of oscillation thereof. By the term "crystal oscillator" is meant any device capable of producing electric oscillations and which includes a piezoelectric crystal either for controlling the frequency of the oscillator or as a component part thereof.

Referring to the drawings, in Figure 1 the invention is shown as employed for measuring the pressure of fluid contained in a well. Numeral 1 denotes generally a well casing disposed within a bore hole. Provided at the upper end of casing 1 is a conventional stuffing box 2 adaptable for receiving cable 3, to which is attached that member 4 of the invention which is adapted to be positioned within the fluid, and also adaptable for permitting slidable movement of cable 3 therethrough whereby member 4, which will be described more fully hereinafter, may be lowered and raised in well casing 1.

Cable 3 passes upwardly through stuffing box 2, over measuring wheel 5, and thence to reel 6 on which the cable is wound, reel 6 being driven by any suitable means, not shown, such as, for example, an electric motor. By means of measuring wheel 5, member 4 may be accurately positioned at a desired point in the well. Encased within cable 3 is a pair of electrical conductors, not shown, the conductors being electrically connected at one of their ends to member 4. The other ends of the conductors are attached to slip rings 7 and 8 which are in frictional engagement with brushes 9 and 10, respectively, brushes 9 and 10 being electrically connected by means of conductors 11 and 12 to direct current power supply 13 and to frequency meter 14 or other suitable means for measuring the frequency of an alternating current signal. With this arrangement, transfer of alternating current signals from member 4 to frequency meter 14 and supply of direct current from power source 13 to member 4 may take place simultaneously through the pair of conductors encased within cable 3.

Member 4 includes housing 15 having a block 16 of copper or other suitable material of high thermal conductivity secured therein in a manner to provide upper compartment 17 and lower compartment 18, as shown. By employing such a material errors due to temperature gradients are limited or at least reduced to a minimum. Within block 16 are provided chambers 19 and 20, each chamber being adaptable for receiving a piezoelectric crystal which is secured in its respective chamber by any conventional means such as, for example, studs. Although any suitable piezoelectric crystal may be employed, it is preferable to utilize a quartz crystal. It is preferable, also, to utilize an A-T cut quartz crystal because of the high activity and good frequency characteristics of such crystals. Crystal 21 is hermetically sealed in chamber 19 so as to maintain the pressure thereon substantially constant at all times. Electrical connection is made with crystal 21 by means of wires 22 which extend through block 16 to standard oscillator 23, provided in upper compartment 17, wires 22 being electrically insulated from block 16 by means of dielectric 24. Since the pressure exerted on crystal 21 is maintained at all times substantially constant, the oscillating frequency of oscillator 23 is constant and the output thereof may be employed as a frequency standard.

In a similar manner, crystal 25 is secured in chamber 20 and electrical connection is made between the crystal and its associated oscillator 26, provided in upper compartment 17, by means of wires 27 which are electrically insulated from block 16 by dielectric 28. Although the frequency at which oscillators 23 and 26 normally oscillate is not critical, a frequency of the order of three to four megacycles is preferable. A soft bellows 29, or any other suitable pressure transmitting means capable of accurately transmitting pressure exerted on the exterior thereof to fluid contained therein, is provided in lower compartment 18 and is hermetically sealed against block 16 by any suitable means such, for example, as by brazing. The arrangement of lower compartment 18 and bellows 29 is such as to permit free distention and contraction of the latter. A passage 30 is provided in block 16 in a manner so as to provide communication between chamber 20 and the interior of bellows 29, as shown. For reasons pointed out hereinafter, chamber 20 and bellows 29 are preferably filled with helium or other suitable gas. A fluid input port 31 is provided in the wall of housing 15, which port communicates with lower compartment 18. It is readily seen that pressure exerted on the exterior of bellows 29 by fluid entering through port 31 into lower compartment 18 will be transmitted by bellows 29 to the gas contained therein, which, in turn, will exert a pressure on crystal 25 in an amount substantially equal that of the fluid pressure. It should be pointed out that chamber 20 and passage 30 should be made as small as practicable consistent with their stated functions so that pressure exerted on the bellows will be accurately transmitted to crystal 25. If either chamber 20 or passage 30 is made unduly large, under high pressures bellows 29 will undergo maximum contraction and absorb a portion of the pressure exerted thereon, thus introducing error in the pressure determination.

Standard oscillator 23 and oscillator 26, which will be described more fully hereinafter, are directly coupled to a conventional mixer circuit 32 wherein the output of the oscillators are heterodyned to provide a beat frequency signal having a frequency equal the instantaneous frequency difference of the oscillators. To mixer 32 is connected cable 3 which extends to the surface and which, in turn, is connected to direct current power supply 13 and frequency meter 14.

Crystal oscillators 23 and 26, preferably of identical construction, may be of any conventional design. In Figure 3 there is shown one type of oscillator which has been found to give satisfactory performance and which is commonly referred to as a "Pierce" oscillator. In this figure an arrangement is shown in which two such oscillators 23 and 26 are supplied with power from a common direct current power supply 13. Crystals 21 and 25 are connected between the plate and grid of their associated triodes 33 and 34. Variable condensers 35 and 36 may be provided across grid resistors 37 and 38, respectively, to permit stabilization of the oscillators. The outputs of oscillators 23 and 26 are taken across plate coils 39 and 40 and are independently coupled through condensers 41 and 42, respectively, into mixer 32, as pointed out hereinbefore.

In operation, after the apparatus has been assembled, member 4 is lowered to a desired position within the well by means of cable 3. Fluid within the well enters lower compartment 18 through port 31 and exerts pressure on bellows 29. By means of bellows 29 this pressure is transmitted to the gas contained therein which, in turn, exerts a pressure on crystal 25 substantially equal the fluid pressure, causing oscillator 26 to oscillate at a frequency dependent upon the pressure of the fluid. The output signal of oscillator 26 together with that of standard oscillator 23 which is maintained at a constant, preselected frequency is fed into mixer 32 wherein the signals are heterodyned, thereby providing a beat frequency signal having a frequency equal the frequency difference of the oscillators. The beat frequency signal is coupled into frequency meter 14 and the frequency thereof measured. By calibration of the frequency meter, pressures may be read directly in pounds per square inch.

By heterodyning the output signals of standard oscillator 23 and oscillator 26, and measuring the frequency of the resulting beat frequency signal, relatively small changes in the oscillating frequency of oscillator 26, and, therefore, in the fluid pressure, may be detected. However, if it is desired, standard oscillator 23 and mixer 32 may be omitted, and the frequency of oscillator 26 measured directly by means of frequency meter 14. It is obvious that in the latter case the sensitivity of the instrument is considerably less than in the former.

Figure 4:
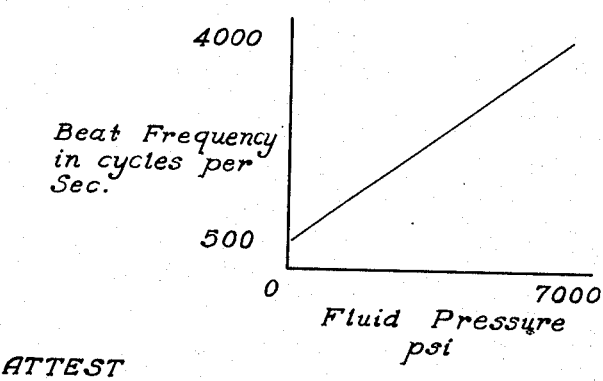
Figure 4 is a curve indicating the relationship between the fluid pressure and the frequency of the beat frequency signal.

As stated above, it has been found that a substantially linear relationship exists between the frequency of oscillation of a crystal oscillator and the pressure exerted on the crystal up to a pressure of 7,000 pounds per square inch and higher. Bearing in mind that the beat frequency is produced by heterodyning the output signal of oscillator 26 with a reference signal of constant frequency, it is readily seen that the same linear relationship exists between the beat frequency and the pressure as exists between the oscillating frequency of oscillator 26 and the pressure. This relationship is illustrated in Figure 4. Figure 4 is a curve showing the manner in which the beat frequency varies with the pressure exerted on the crystal when employing a crystal oscillator of the type shown in Figure 3 containing an AT cut quartz crystal, the oscillating frequency of oscillator 26 at atmospheric pressure being approximately 3.7 megacycles. By means of such instrument fluid pressures up to 7,000 pounds and higher may be measured with an accuracy of at least 0.3 per cent.

The frequency of the beat frequency signal at atmospheric pressure is dependent upon the pressure exerted on the crystal of standard oscillator 23 and the pressure of the gas within bellows 29. These pressures may be so selected as to obtain a desired beat frequency. Although the frequency of the beat signal at atmospheric pressure is not critical, a frequency of a magnitude of 500 cycles per second is preferable.

Although it is necessary to employ bellows 29 containing gas when measuring the pressure of a liquid medium because of the difficulty encountered in sustaining oscillation of oscillator 26, the bellows may be omitted and the crystal exposed directly to the fluid when employing the instrument to measure the pressure of a dry, non-corrosive gaseous medium.

It is obvious that mixer 32 can be located at the surface of the earth rather than within member 4 in which case the output signals from both standard oscillator 23 and oscillator 26 are conducted to the earth's surface by means of cable 3.

Although the invention has been described in connection with measurement of pressures within a well, the use thereof is not so restricted but may be employed wherever it is desirable to accurately measure the pressure of a gas or liquid medium and particularly at localities inaccessible to an observer.

We claim:

1. Apparatus for measuring fluid pressure which comprises a crystal oscillator, a housing for the oscillator adaptable for positioning within the fluid, a chamber within the housing for enclosing the crystal, a pressure transmitting means hermetically sealed against the chamber and communicating therewith, gas enclosed in said chamber and transmitting means and directly contacting said crystal, said gas comprising the only means for transmitting pressure from said pressure transmitting means to said crystal, passage means in the housing for permitting the fluid to enter thereinto and contact the pressure transmitting means whereby pressure of the fluid is transmitted to the gas which, in turn, exerts a pressure on the crystal substantially equal to the fluid pressure, and means for measuring the resulting frequency of oscillation of the crystal oscillator.

2. Apparatus for measuring fluid pressure which comprises a crystal oscillator, a housing for the oscillator adaptable for positioning within the fluid, a chamber within the housing for enclosing the crystal, a bellows hermetically sealed against the chamber and communicating therewith, gas enclosed in said chamber and bellows and directly contacting said crystal, said gas comprising the only means for transmitting pressure from said bellows to said crystal, a passage in the housing for permitting the fluid to enter thereinto and contact the bellows whereby pressure of the fluid is transmitted to the gas, which, in turn, exerts a pressure on the crystal substantially equal to the fluid pressure, and means for measuring the resulting frequency of oscillation of the crystal oscillator.

3. Apparatus for measuring fluid pressure which comprises a first and a second crystal oscillator, a housing for the oscillators adaptable for positioning within the fluid, means for maintaining the pressure on the first crystal substantially constant, a chamber within the housing for enclosing the crystal of the second crystal oscillator, a pressure transmitting means hermetically sealed against the chamber and communicating therewith, gas enclosed in said chamber and transmitting means and directly contacting the second crystal, said gas comprising the only means for transmitting pressure from said pressure transmitting means to the second crystal, passage means in the housing for permitting the fluid to enter thereinto and contact the pressure transmitting means whereby pressure of the fluid is transmitted to the gas which, in turn, exerts a pressure on the second crystal substantially equal to the fluid pressure, means for producing an alternating current signal of a frequency equal to the frequency difference between the first and the second oscillators, and means for measuring the frequency of said signal.

4. Apparatus for measuring fluid pressure which comprises a first and a second crystal oscillator, a housing for the oscillators adaptable for positioning within the fluid, means for maintaining the pressure on the first crystal substantially constant, a chamber within the housing for enclosing the crystal of the second crystal oscillator, a bellows hermetically sealed against the chamber and communicating therewith, gas enclosed in said chamber and bellows and directly contacting the second crystal, said gas comprising the only means for transmitting pressure from said bellows to the second crystal, passage means in the housing for permitting the fluid to enter thereinto and contact the bellows whereby pressure of the fluid is transmitted to the gas which, in turn, exerts a pressure on the second crystal substantially equal to the fluid pressure, means for producing an alternating current signal of a frequency equal to the frequency difference between the first and the second oscillators, and means for measuring the frequency of said signal.

HENRY F. DUNLAP.
JOHN H. RAMSER.

References Cited in the file of this patent

UNITED STATES PATENTS

| Number | Name | Date |
|---|---|---|
| 2,315,756 | Warner | Apr. 6, 1943 |
| 2,421,423 | Krasnow | June 3, 1947 |
| 2,459,268 | Elkins | Jan. 18, 1949 |
| 2,536,111 | Van Dyke | Jan. 2, 1951 |
| 2,547,875 | Krasnow | Apr. 3, 1951 |

OTHER REFERENCES

French publication—"Mesures," March 1947 issue, pp. 73–77.